United States Patent

[11] 3,633,490

[72] Inventors Robert F. Schiffmann
  Brooklyn;
  Howard Roth, Bronx; David H. Lipka, Roslyn; Abraham H. Goodman, Great Neck, all of N.Y.
[21] Appl. No. 64,433
[22] Filed Aug. 17, 1970
[45] Patented Jan. 11, 1972
[73] Assignee DCA Food Industries, Inc.
  New York, N.Y.
  Continuation of application Ser. No. 519,255, Jan. 7, 1966, now abandoned.
  This application Aug. 17, 1970, Ser. No. 64,433

[54] APPARATUS FOR PRODUCING COOKED PRODUCTS
  13 Claims, 5 Drawing Figs.
[52] U.S. Cl..................................................... 99/339,
  99/1, 99/405, 99/407, 99/443 C, 99/DIG. 14,
  219/10.47, 219/10.69
[51] Int. Cl....................................................... A47j 37/12
[50] Field of Search............................................ 219/10.55,
  10.57, 10.47, 10.69; 99/1, 86, 94, 339, 353, 354,
  404, 405, 406, 407, 443, DIG. 14, 100

[56] References Cited
UNITED STATES PATENTS
2,491,687 12/1949 Nutt............................ 219/10.69 X
2,605,383 7/1952 Spencer........................ 219/10.55
2,997,566 8/1961 Pierce et al................... 219/10.47
3,283,695 11/1966 Belshaw et al................ 99/354
3,365,301 1/1968 Lipoma et al................. 99/100
3,479,188 11/1969 Thelen........................... 99/86

FOREIGN PATENTS
639,895 7/1950 Great Britain................. 99/404

Primary Examiner—Billy J. Wilhite
Attorney—Amster & Rothstein

ABSTRACT: A fried bakery product, such as a chemically leavened and extruded doughnut, is produced by apparatus which is arranged to first totally immerse a piece of dough for the fried product in a frying vessel containing an edible frying medium at a frying temperature wherein the edible frying medium is liquid and for a time sufficient to assure proper shaping of the dough piece. Thereafter, the dough piece, while partially immersed in the frying medium, is moved by a conveyor to an intermediate location of the frying vessel at which it is subjected to microwave energy from a microwave source concurrent with frying of the underside thereof. The fried product is completed by the provision of an inverting mechanism which turns the same in the frying medium. The resulting product has a number of improved characteristics including uniform crumb density and better physical properties and eating characteristics.

PATENTED JAN 11 1972

INVENTORS
ROBERT F. SCHIFFMAN
HOWARD ROTH
DAVID H. LIPKA
BY ABRAHAM H. GOODMAN

Amster Rothstein
ATTORNEYS

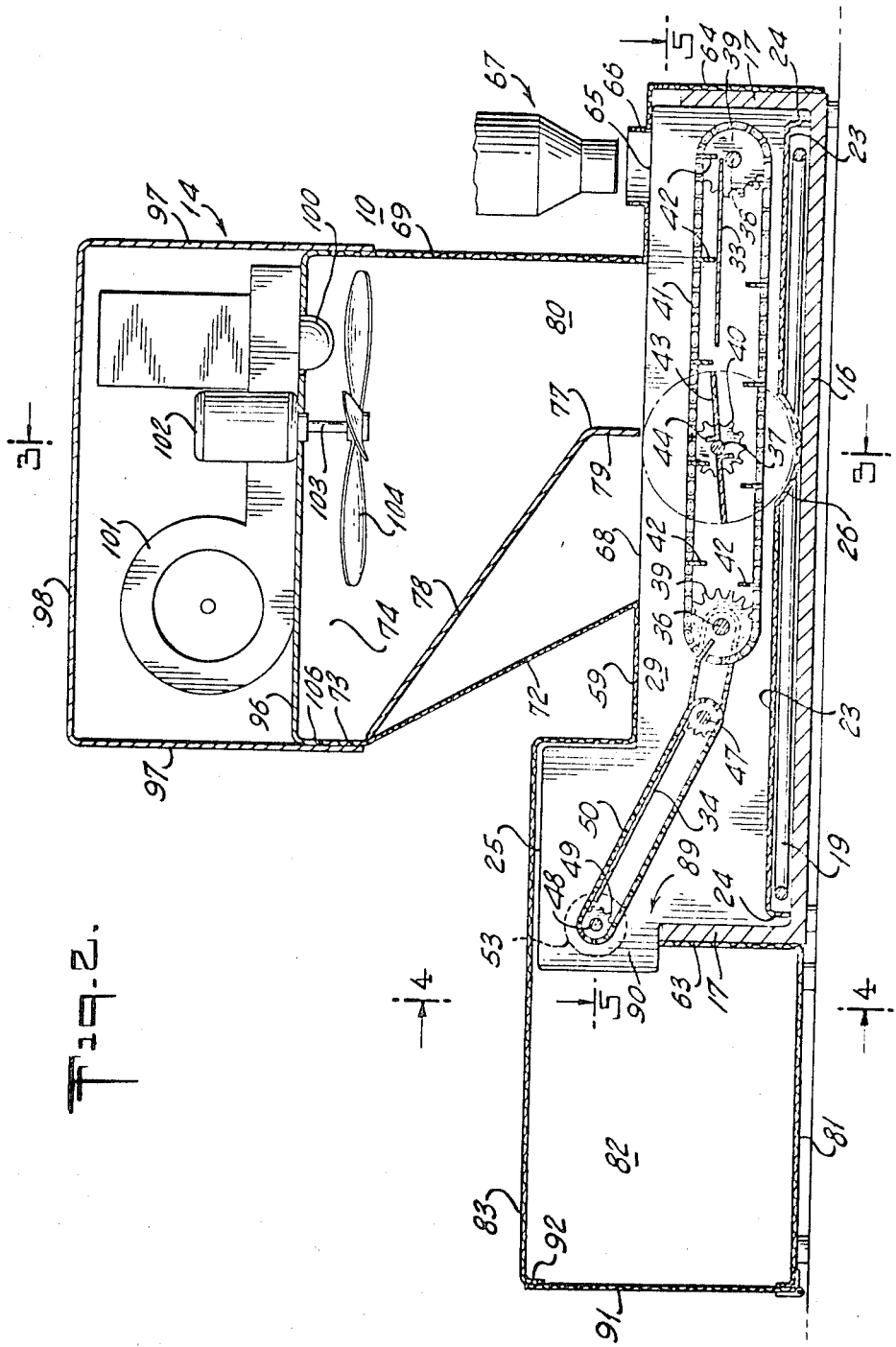

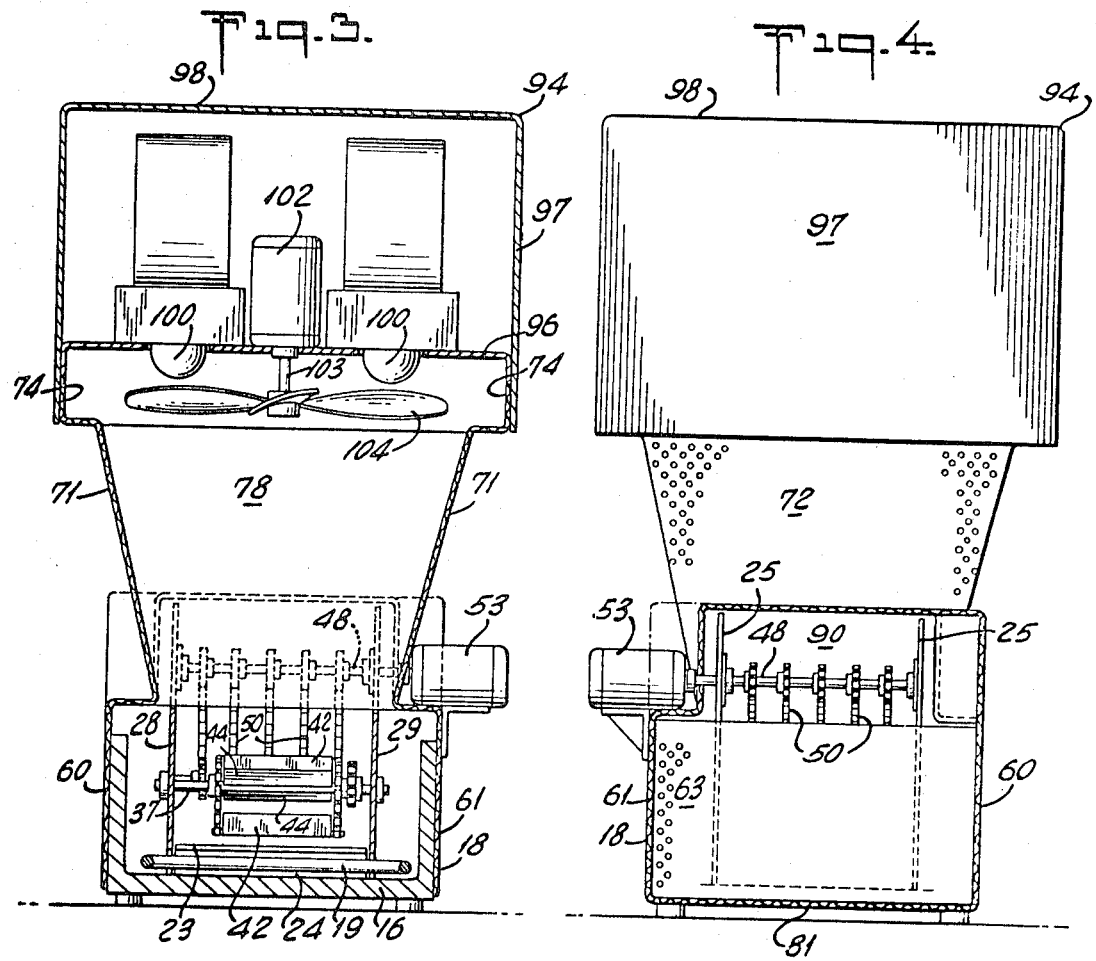

APPARATUS FOR PRODUCING COOKED PRODUCTS

This is a division of U.S. application Ser. No. 519,255, filed Jan. 7, 1966 in the name of Robert F. Schiffmann et al. for "Method of Producing Cooked Products and Apparatus Therefor" now abandoned.

The present invention relates generally to the production of comestibles and, in particular, to an improved apparatus for the production of fried cakes, such as doughnuts and the like.

The conventional method of cooking doughnuts requires that a cut and shaped piece of doughnut dough be dropped into hot fat in which it remains submerged for from 2 to 10 seconds, after which the piece will float to the surface with a portion thereof out of the fat. As is generally understood, this total immersion of the cut and shaped piece of doughnut dough causes the formation of a shape-retention skin thereon which assures that the dough, after being cooked in the frying fat, will expand properly. If the submersion is of too short a time, there is a tendency for the dough when cooked to misshape, for example, to expand too much in the lateral direction, causing the final product to appear flattened and ringy and to have an oversized hole in the center thereof. With the presence of an appropriate shape-retention skin, desirable lateral and height proportions will be established during expansion and usually the hole size will decrease and change the shape of the contiguous wall into a star-shaped configuration. Commonly, such a doughnut is referred in the trade as a "blooming doughnut."

If the total submergence period is too long, that is, in excess of 10 seconds, the shape-retention skin becomes a crust which will significantly reduce the expandability of the dough during the remainder of the frying. As long as the total submergence phase of the cooking lies between 2 and 10 seconds, the half of the dough which floats above the level of the fat is still expandable within the shape-retention skin. Although some doughnuts and other fried cake products are cooked completely by forcing the product to be submerged for the entire cooking time, most doughnut products are cooked in two parts, that is, the lower part of the doughnut remaining below the surface of the fat after the initial total submergence is fried for 40 to 60 seconds and then the unfinished doughnut is turned over so that the uncooked upper part that was floating above the surface of the fat is submerged. This second phase of cooking again takes from 40 to 60 seconds for completion of the cooking process. This latter method of cooking is preferred even though it takes from 80 to 120 seconds as compared to 60 to 80 seconds for totally submerged cooking because many favorable product characteristics can be obtained. These characteristics include texture and thickness of the crust, texture and appearance of the crumb and shaping characteristics, such as the formation of a star-shaped hole in the doughnut characteristic of the blooming doughnut. A most important characteristic effected, however, is the size or volume of product per unit weight of dough used. The two-part cooking method can produce 50 percent more volume per unit weight of dough than can be produced by the totally submerged cooking method.

Even though the two-part cooking method is a distinct improvement over the method in which the comestible is totally submerged, it has the drawback of requiring up to two times the frying time and therefore, the use of very large frying vessels and large quantities of fat to fill them for high production. This is an important disadvantage since in most commercial bakeries space is at a premium. Likewise of importance is the fact that the chemical nature of fat and the conditions under which it is used require that it be consumed, that is, removed by the product, and replaced with fresh unused fat at a rate of not less than 30 percent of the total fat capacity of the vessel for 7 hours of production, otherwise fat oxidation products will accumulate to excessive levels and be deleterious to the quality of the fried product.

In addition to the above drawbacks, the conventional cake frying procedures possess many other important disadvantages. The fried cakes, even when produced by the two-part frying method, do not have a specific volume which approaches the theoretically available specific volume for the specific dough employed, the cakes are not uniform in their physical characteristics and appearances, close process control must be observed, and the conventional cake frying processes otherwise leave much to be desired.

It is, therefore, a principal object of the present invention to provide an improved apparatus for the production of comestibles.

Another object of the present invention is to provide an improved apparatus for the cooking of dough in the production of fried cakes such as doughnuts and the like.

Still another object of the present invention is to provide improved equipment for the production of fried cakes in which the cooking time is greatly reduced and the capacity of the related processing apparatus, relative to its size, is greatly increased.

A further object of the present invention is to provide an improved apparatus for the production of fried cakes wherein the volume of cooking oil employed in the apparatus relative to the oil consumption is greatly reduced thereby reducing the production of undesirable oxidation products.

Still a further object of the present invention is to provide improved fried cake cooking equipment wherein a maximum specific volume of product is achieved in relationship to the dough being employed.

Another object of the present invention is to provide an improved fried cake cooking unit which requires a minimum of process control and dough property control and which efficiently produces cakes of uniform high quality, physical characteristics and appearance.

Still another object of the present invention is to provide apparatus of the above nature characterized by its reliability, flexibility, versatility and ease of operation.

In accordance with an illustrative embodiment demonstrating apparatus aspects of the present invention, there is provided apparatus for forming and frying bakery products comprising an elongated frying tank having an input section, an intermediate section and an output section which is adapted to contain a liquid cooking medium. Means are provided for heating the cooking medium to a frying temperature. A conveyor is arranged within the tank for advancing partially submerged bakery products to be fried along a conveyor path from the input section through the intermediate section and to the output section at a prescribed rate. A dough ring cutting and extruded device is arranged over the input section of the frying tank and is adapted to drop successive extruded dough pieces for the bakery product into the input section of the frying tank along the conveyor path. The conveyor is constructed and arranged such that successive dough pieces are initially totally submerged in the cooking medium and then advanced toward the intermediate section in a partially submerged condition. A microwave generator including a cavity and an energy-outlet port is arranged to introduce the microwave to the intermediate section of the frying tank and along the conveyor path such that successive partially submerged dough pieces are exposed to microwave energy from the microwave generator for a time determined by the prescribed rate and the dimensioning of the energy outlet port. A dough-piece-turning mechanism is arranged within the frying tank along the conveyor path and following the intermediate section for turning successive dough pieces after exposure to the microwave energy and for delivering the turned dough pieces to the output section of the frying tank.

The above and other objects of the present invention will become apparent from a reading of the following description taken in conjunction with the accompanying drawing, wherein:

FIG. 2 is a vertical longitudinal sectional view thereof;

FIG. 3 is a sectional view taken along line 3—3 of FIG. 2;

FIG. 4 is a sectional view taken along line 4—4 of FIG. 2; and

FIG. 5 is a sectional view taken along line 5—5 of FIG. 2.

Figure 1:
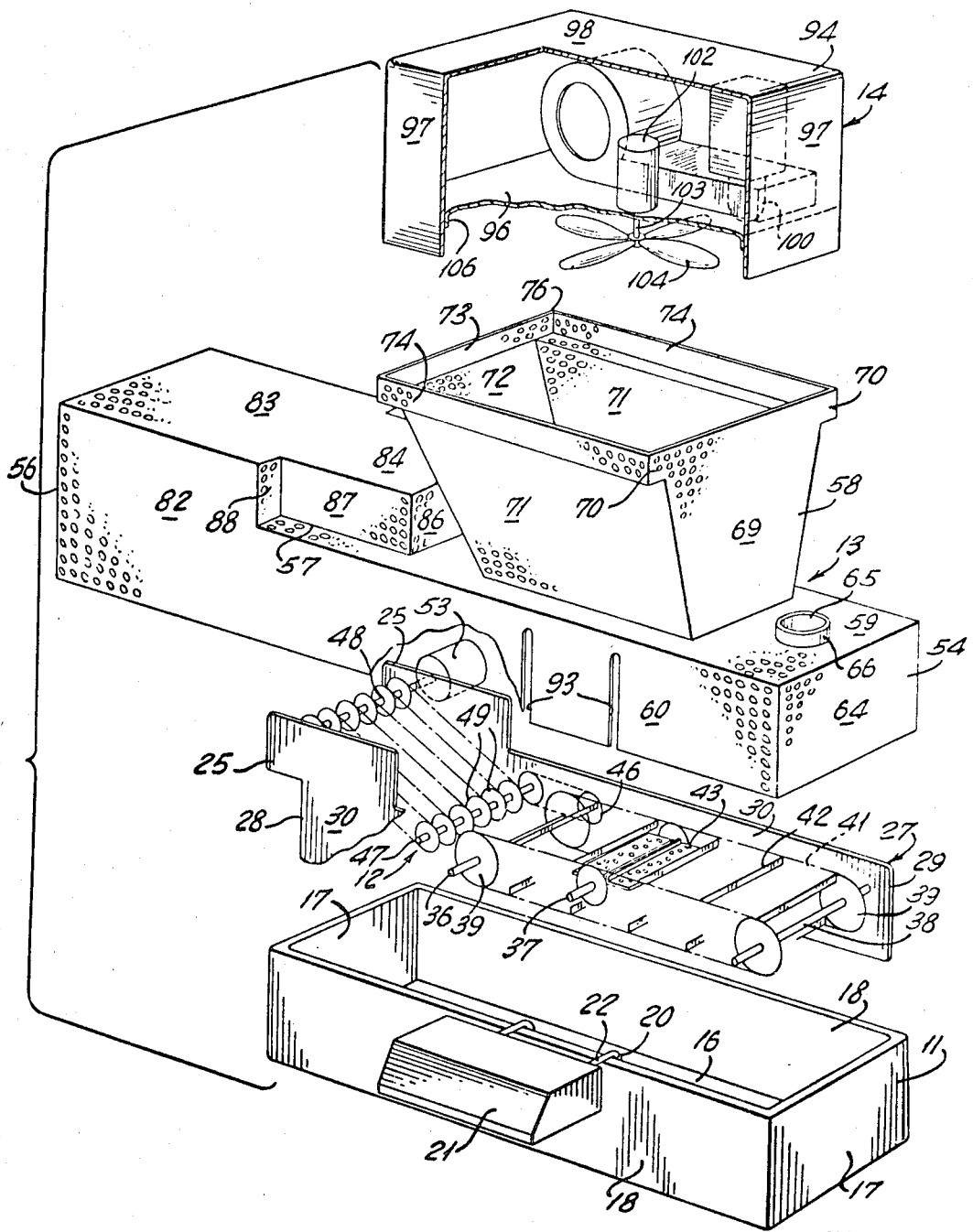
FIG. 1 is an exploded perspective, part fragmentary, view of an apparatus embodying the present invention.

The present invention contemplates apparatus for producing a cooked product arranged to provide for the external application of heat to a side of an extruded piece of heat expandable dough to form a crust thereon while leaving another side thereof in a substantially uncrusted state and a microwave generator for subjecting said partially cooked piece of dough to a high-frequency electromagnetic field to heat said dough internally and effect the expansion thereof. The present apparatus includes an extruder which is charged with a dough batter containing a chemical leavening agent and is arranged to form and extrude dough rings directly above a cooking vessel containing a hot cooking oil at a point trailing the zone to which the high-frequency field is confined. The vessel is provided with a conveyor for continuously advancing the dough pieces from a trailing to a leading section, the high-frequency field being confined to an intermediate section and means are provided for turning the dough pieces following the high-frequency zone to deposit them in the leading section in an inverted state. Confining the high-frequency or microwave field to the intermediate section of the conveyor assures the proper shaping of the dough through the formation of the shape-retention skin in advance of subjecting the then partially immersed dough to the microwave field. The cooking oil is maintained at a temperature ranging between 300° F. and advantageously between 350° and 375° F. The dough piece is disposed in the trailing or partial crusting section for a period between 1 and 20 seconds, advantageously between 6 and 15 seconds to assure shaping by the formation of a shape-retention skin before it is completely positioned in the high-frequency zone wherein the dough piece is partially submerged with its upper portion in an expandable state and its lower submerged portion in a crusted substantially unexpandable state, such condition permitting the desired expansion and shaping of the dough piece in an optimum manner. The dough piece, in the high-frequency field hereinafter set forth, that is, for example, a frequency of 2,450 megacycles per second at a power of 1.6 kilowatts, is advantageously exposed to the high-frequency field for a period of between 10 and 25 seconds, preferably between 15 and 20 seconds, and is removed from the high-frequency zone and inverted in the hot oil in the leading zone where the cooking of the inverted piece of dough in the hot oil is completed for a period between 20 and 40 seconds, advantageously between 25 and 35 seconds. The dough piece, to advantage, may also be exposed to the high-frequency field following the inversion of the expanded dough piece in the hot oil in the leading zone, for at least part of its presence in the leading zone. As an alternative, the dough piece may be expanded and its cooking completed while exposed to the high-frequency field and without inversion by exposing the floating dough piece to the high-frequency field for a period advantageously between 20 and 55 seconds and preferably between 30 and 40 seconds. During this latter period, it has been observed that the oil appears to be pumped over the upper face of the dough piece eventually to effect the cooking and crusting thereof following its expansion. The frequency of the electromagnetic field is that normally employed in dielectric heating, for example, between 915 and 2,450 megacycles per second and its intensity and the time of exposure of the dough piece is sufficient to effect the desired expansion of the dough and can be readily determined by one skilled in the art, it being noted that the expansion of the dough piece in the high-frequency field is a function of the frequency and intensity of the field and the time of exposure thereto.

Apparatus for practicing the present invention includes an elongated vessel containing a cooking oil and means for heating the oil to a predetermined temperature. There are located in the cooking vessel conveying means for advancing the dough pieces and which include longitudinally spaced transversely extending flights, and dough piece inverting means including rotating paddles positioned between the ends of the conveyor. A perforated cage defining a high-frequency compartment encloses at least an intermediate section of the cooking vessel trailing the inverting means and confined passageways extend forwardly and rearwardly of the compartment, the high-frequency field being highly attenuated in these passageways. The trailing passageway is provided with a top opening at its trailing end with which registers the nozzle of a conventional dough ring forming extruding and cutting device. A high-frequency generator is positioned in the compartment and is connected to a suitable energy source.

Referring now to the drawings, reference numeral 10 generally designates apparatus for practicing this new process which comprises an open topped elongated tank or cooking vessel 11, a dough piece conveyor and flipper assembly 12, a high-frequency radiation confining housing or cage 13 and a high-frequency generator assembly 14. Tank 11 is formed of any suitable metal and is of rectangular configuration including a bottom wall 16, end walls 17, and front and rear walls 18.

A heating element 19, in the form of a metal sheathed resistance heater, is disposed in tank 11 and extends along bottom wall 16 and is provided with end legs 20 extending upwardly along front wall 18 to a power controlling and temperature regulating box 21 (see FIG. 1). Control box 21 is of conventional construction, controlling the electrical energization of the heating element 19 in response to a thermostatic device to regulate the temperature of the cooking oil in tank 11 to an adjustable predetermined frying temperature. The control box 21 is positioned forwardly of front wall 18 and is suitably mounted and is connected to the heating element end legs 20 by short arms 22. Supported in tank 11 immediately above heating element 19 and of a width somewhat less than that of bottom wall 16 is a rectangular grid 23 (see FIG. 2), provided at opposite ends with transversely extending depending flanges 24 which rest on the end borders of the bottom wall 16 to removably support grid 23. A transversely extending arcuate channel 26 is formed in grid 23 between the ends thereof.

The conveyor and flipper assembly 12 comprises a support frame 27 which removably rests in tank 11 and includes front and rear similar panels 28 and 29 respectively, which are parallel and adjacent to front and rear walls 18 of the tank. Each panel 28 and 29 includes a leading upper corner 25 of small rectangular section which substantially rests on the upper edge of the leading end wall 17 of the tank, the main rectangular section 30 having legs resting on tank bottom 16, with a leading edge thereof contiguous to the tank leading end wall 17, and a trailing edge contiguous to the tank trailing end wall 17, and a top edge shortly above that of tank 11.

A horizontal drop plate 33 (see FIGS. 2 and 5) extends transversely between and is secured to opposite trailing ends of main sections 30 between the top and bottom edges thereof, and an upwardly forwardly inclined discharge ramp plate 34 is located between and is secured to the upper leading parts of plates 28 and 29 and terminates at the leading sections 25.

Journaled in and extending between plates 28 and 29 are transversely extending parallel leading, intermediate and trailing shafts 36, 37 and 38, respectively, shafts 36 and 38 being disposed just below the level of drop plate 33, trailing shaft 38 being located below the trailing edge of drop plate 33, and intermediate shaft 37 being above the level of shafts 36 and 38. Affixed to shafts 36 and 38 are pairs of similar sprocket wheels 39 which are spaced inwardly of the confronting faces of plates 28 and 29, and affixed to the shaft 37 are sprocket wheels 40 which are smaller than sprocket wheels 39 and are likewise spaced inwardly of support plates 28 and 29. A pair of transversely spaced parallel, longitudinal sprocket chains 41 are supported by and between corresponding sprocket wheels 39 and engage the upper teeth of sprocket wheels 40.

Supported by and between and depending from sprocket chains 41 are regularly longitudinally spaced parallel transversely extending flights 42 which are advanced by sprocket chains 41 from the trailing sprocket wheels 39 along the upper face of drop plate 33, to the leading sprocket wheels 39 and then under, around and back to and around trailing sprocket wheels 39. A pair of perforated transversely extending flipping paddles 43 are affixed to and project radially oppositely from intermediate shaft 37 which is coaxial with arcuate channel 26, each paddle 43 being of somewhat less depth than the distance between successive flights 42, and being provided along its inner edge with a flange 44 projecting in the direction of rotation of the paddles 43. Sprocket wheels 39 and 40 are so dimensioned and related that with each increment advance of a flight 42 for a distance equal to that between successive flights 42, shaft 37 rotates 180° and the trailing flipping paddle 43 receives a dough piece located in a pocket or cell between a pair of adjacent flights 42 and inverts the dough piece and deposits it into the advancing pocket. It should be noted that the level of the cooking oil in the tank 12 is above that of the drop plate 33 preferably by an amount about that of the height of the dough ring being cooked and at about the level of or slightly below the upper sections of flights 42. A gear 46 is affixed to the rear end of the leading shaft 36.

A lower transversely extending shaft 47 is disposed below and trails the trailing edge of ramp plate 34 and an upper transverse shaft 48 is disposed adjacent to and in advance of the leading upper edge of ramp plate 34. Shafts 47 and 48 are journaled to and between support plates 28 and 29 and a plurality of axially spaced sprocket wheels 49 are affixed to each of shafts 47 and 48, said sprocket wheels being longitudinally aligned. A sprocket chain 50 extends between and about each pair of longitudinally aligned sprocket wheels 49 and extends along the upper face of ramp plate 34, the trailing edges of the sprocket chains being shortly forward of the leading end run of flights 42. A gear 51 is affixed to the rear end of shaft 47 and is coupled to gear 46 by a sprocket chain 52. Drive shaft 48 is driven in any suitable manner, such as by a suitably mounted adjustable speed drive motor 53 connected to shaft 48. Motor 53 is driven to advance sprocket chains 50 and flights 42 along their upper runs. Sprocket wheels 49 on upper shaft 48 are disposed directly above the upper edge of the tank leading end wall 17 so that the conveyor defined by the sprocket chains 50 discharges over the upper edge of leading end wall 17.

The cage 13 functions to direct and confine the high-frequency radiation from generator assembly 14 to a predetermined area of cooking tank 11, specifically between flipper shaft 37 and a section trailing shaft 38 or alternatively between shaft 36 and said trailing section, and to minimize external radiation. Cage 13 is formed of a perforated metal, the openings being large enough to permit the circulation of air therethrough but sufficiently small to prevent the passage of the high-frequency heating radiation, and includes a lower main section 54 which engages and houses cooking tank 11, a discharge section 56 forward of and extending above main section 54, an intermediate section 57 affording communication between the upper adjacent parts of sections 54 and 56, and a high-frequency coupling section 58 extending above main section 54.

Main section 54 comprises a rectangular top wall 59 of substantially the corresponding horizontal dimensions of cooking tank 11, depending front and rear walls 60 and 61 and vertical leading and trailing end walls 63 and 64, respectively. Cage walls 60, 61, 63 and 64 extend substantially to the bottom of cooking tank 11 and engage the outside faces of the corresponding walls thereof and the cage top wall 59 is disposed above the cooking tank 11 at about or slightly above the level of the upper edges of support plate sections 30. Formed in the trailing border of the cage top wall 59, intermediate its front and rear edges is a circular dough piece feed port 65 provided with an upstanding peripheral flange 66. A dough ring extruding and cutting device 67 of conventional construction coaxially registers with the port 65 and is synchronized with conveyor sights 42 in the known manner to drop a dough ring through port 65 into an underlying pocket between successive flights 42, during each increment advance of the flights 42.

A rectangular opening 68 is formed in the cage top wall 59 forward of feed port 65 and extends for a short distance less than the width of wall 59 and about to the leading end of the upper run of flights 42. Coupling section 58 is substantially hopper shaped, open at its top and bottom and registering with opening 68, and includes a vertical trailing wall 69 directed upwardly from the trailing edge of opening 68 and provided at its upper border with transversely projecting coplanar wings 70, and upwardly diverging front and rear walls 71, and a forwardly upwardly inclined leading wall 72 terminating in a transversely extending vertical flange 73. The upper edges of front and rear walls 71 are provided with outwardly directed horizontal flanges which terminate in upwardly directed flanges 74. The upper border of wall 69 and flanges 73 and 74 define a rectangular coupling frame 76. A removable perforated metal partition 77 is disposed in coupling section 58 and includes a panel 78 inclined rearwardly downwardly from the upper edge of the wall 72 and terminating in a depending skirt 79 disposed at about the level of the opening 68 and substantially intermediate its leading and trailing edges, partition 77 extending between sidewalls 71 and defining therewith and with the rear wall 69 a high-frequency directing compartment 80.

Discharge section 56 includes a rectangular base wall 81 projecting forwardly of the bottom edge of wall 63 substantially coplanar with the bottom of the cooking tank 11 and is provided with vertical front and rear walls 82 extending upwardly from corresponding edges of base wall 81 to a level above that of main section top wall 59. The upper edges of the walls 82 are joined by a horizontal top wall 83 which extends rearwardly of wall 63 to a point shortly forward of wall 72 and is at a level above the upper ends of conveyor chains 50 to permit the discharge of dough pieces into the discharge section 56. The trailing section 84 of top wall 83 is of reduced width, and a vertical wall 86 depends from the trailing edge thereof to wall 59. Front and rear walls 87 extend between the corresponding edges of wall section 84 and wall 59 are joined to front and rear walls 82 by vertical transverse panels 88 which extend between walls 59 and 83. A rectangular discharge opening 89 is formed in the leading part of wall 59 and is delineated by the lower edges of walls 86 and 87 and the upper edge of wall 63, communicating with cage section 56 through an opening 90 between the upper edge of wall 63 and wall 83, wall 83 being located some distance above the discharge end of conveyor chains 50. The front wall of cage section 56 is defined by a rectangular panel 91 hinged along its bottom edge to the leading edge of wall 81 and bearing at its upper border on a lip 92 depending from the leading edge of wall 83 thereby to permit access to cage section 56. It should be noted that suitable slots 93 are provided in the front wall 60 of the cage and in rear wall 87 to provide clearance for heater element arms 22 and shaft 48 respectively and to permit the driving of the latter.

The high-frequency generator assembly 14 comprises a metal housing 94 which includes a rectangular base 96, peripheral vertical walls 97 which are secured to the edges of and project above and below base 96, and a top wall 98. One or more magnetron assemblies are mounted on base 96 and include the conventional arrangement of magnets and magnetrons 100, the output section of each magnetron 100 projecting through openings in base 96 into compartment 80. A blower 101 is associated with each magnetron 100 and circulates air around the magnetron 100 to effect the cooling thereof. Magnetrons 100 are connected to a suitable source of energizing current in the known manner. Also mounted on baseplate 96 is a drive motor 102 connected to a suitable source of power and including a vertical drive shaft 103 projecting through an opening in the base 96 and having affixed thereto a horizontal metal fan or stirrer 104, the blades of which move in a path directly below magnetrons 100. Fan 101 functions to circulate the air and to effect an improved high-frequency field distribution in and through compartment 80.

Housing 94 is separably mounted on coupling section 58, base 96 being provided with depending peripheral flanges 106 which rest on the upper edges of flanges 73 and 74 and wall 69, and the lower borders of the housing peripheral walls 97 engaging the outer faces of flanges 73, 74, wings 70 and the upper border of wall 69.

In employing the apparatus described above in the practice of the present improved process as applied to the production of chemical leavened fried doughnuts, tank 10 is filled with a cooking material, which may be an oil, fat or the like, to a point at about the upper level of the advancing flights 42. The control box 21 is adjusted to the desired temperature to energize heating element 19, thereby to heat the oil to the adjusted regulated temperature. The apparatus is assembled as shown in the drawings and the magnetrons 100, blower 101, drive motor 53 and fan motor 102 are energized. Conveyor flights 42 and conveyor belts 50 are thus continuously advanced and the flippers 43 synchronously rotated, and a high-frequency electromagnetic field is established in the compartment 80 and is directed into the tank 11 and confined to a zone therein defined substantially by the vertical projection of the area delineated by the lower edges of the partition flange 79, wall 69 and walls 71. The doughnut ring forming device 67 is actuated in synchronism with the advancing flights 63 to drop a dough ring through port 65 into successive pockets between flights 42. The presence of plate 33 prevents the fresh dough ring from dropping to the bottom of tank 11 and plate 33 is so positioned in relation to the level of the fat such that the entire dough ring is totally immersed for a period sufficient to form the shape-retention skin before it becomes buoyant. Thereafter, a substantially nonexpandable crust is formed on the underface of the dough ring as it is advanced by flights 42, with the dough ring floating in the fat. During the initial advance of the floating dough ring, relatively little expansion is effected. However, as the floating dough ring is advanced to the high-frequency zone, as defined above, it is rapidly internally heated by the microwave energy and the full expansion of the dough ring is achieved in a highly superior and desirable manner, the crusting of the underface of the dough ring effecting an important contribution to the proper control of such expansion. Upon the dough ring reaching the turning paddle 43, it has reached substantially its full expansion as effected by the high-frequency field and is then inverted and partially submerged in the oil to form a crust on the side previously uppermost, and hence complete the doughnut cooking cycle. The cooked doughnut is advanced by a flight 42 onto the conveyor chains 50 where it is carried from the tank 10 and discharged over the edge thereof into a tray which may be housed in the discharge section 56. The filled tray may be removed from the discharge section 56 through the end thereof by opening the door 91.

The temperature of the hot cooking oil, the frying time of the submerged lower portion of the doughnut prior to the high-frequency heating thereof and the high-frequency heating time depend on the composition of the dough or batter and the desired end product and are advantageously within the ranges set forth above. The frying and exposure times may be adjusted by adjusting the speed of the drive shaft 48 either by way of motor 53 or otherwise.

As described earlier, the piece of dough may be completely fried on both sides without necessitating the turning thereof. According to this latter practice, the paddles 43 are removed and the partition 77 is advantageously likewise removed. The dough pieces, as they are advanced by the flights 42, first have expansion restricting crusts formed on their underfaces and are then exposed to the high-frequency field. It has been observed that the hot oil is pumped and flows over the upper faces of the dough pieces exposed to the high-frequency field. However, before any restrictive crust is formed on the dough piece top face, the dough piece fully expands and by the time the dough piece leaves the high-frequency field zone, the upper face thereof is fully fried and crusted by the pumped hot oil.

As one specific example for utilizing the present equipment, a batter of the following composition was produced in the conventional manner:

30.0 parts water
42.0 parts wheat flour
16.0 parts sucrose
4.0 parts shortening
3.5 parts skim milk solids
1.5 parts yolk solids
1.3 parts chemical leavening
1.0 parts dextrose
0.7 parts salt The cooking oil was regulated to a temperature of from 350° to 375° F. and rings of the batter were formed by the extruding and cutting device 67 and dropped through port 65 into successive advancing cells or pockets. The advancing rate of the flights 32 was adjusted so that the dough rings were in the cooking oil 10 to 15 seconds to assure proper shaping before entering the high-frequency field zone and they were exposed to the high-frequency electromagnetic field for from 10 to 20 seconds. The electromagnetic field had a wavelength of 12.3 centimeters and the magnetrons 100 delivered 1.6 kilowatts of power. It should be noted that a radiation confining, swingable metal flap may depend from the lower edge of the wall 69 into the oil in the tank 11. The dough piece was then flipped from the high-frequency zone and its opposite face fried for a period of about 20 to 40 seconds and then discharged.

The product obtained was a fully cooked and crusted doughnut having a specific volume greater than 3.6 cc./gram. The cooking process took from 50 to 70 seconds, which is approximately one-half to two-thirds of the conventional cooking time.

It is critical under the above conditions to the achievement of optimum production of the subject product by the present cooking method that the application of the microwave high-frequency electromagnetic energy occur 6 to 15 seconds after the dough enters the frying fat to assure the formation of the shape-retention skin of a strength sufficient to appropriately control expansion when the dough piece is subsequently exposed to the microwave energy. If this time element is not observed, the product will not shape properly.

Optimum results are obtained for the present formulation when the frying fat temperature is held between 350° and 375° F. At higher temperatures, the rise time is too fast to permit enough skin formation on the second side of the doughnut and misshaping occurs when microwave electromagnetic energy is applied. At lower temperatures, browning and crusting are insufficient. On the other hand, a doughnut formulation as described above but containing one-quarter less chemical leavening is cooked to optimum quality in frying fat kept between 350° and 365° F.

In accordance with another example, the batter composition described above was employed with the addition of up to 2.0 parts of glycine, lycine or glucosamine or a combination thereof, preferably between 0.5 parts and 1.5 parts. The partition 77 and the flippers 43 were removed and the cooking oil was adjusted to a temperature of 350° to 375° F. Dough rings were dropped into the kettle through port 65 and were fried while advancing for 6 to 15 seconds before they enter the high-frequency zone as delineated by the full opening 68. The dough pieces were exposed to the high-frequency field while being advanced for a period of 30 to 40 seconds where they expanded, fully cooked and crusted, and were then discharged by conveyor chains 50.

It will be noted that in the last described technique of cooking the doughnut, it was not turned over in the fat but was cooked and crusted on both sides by a surprising and completely unexpected phenomenon. The phenomenon is characterized by a fountain effect in which the cooking oil is pumped up through the hole in the doughnut and cascades back down over the entire top surface so that the entire doughnut is enveloped in hot fat in the high-frequency field. It has been found that by adding amino acids or Maillard intermediates sufficient coloring of the second side of the doughnut can be obtained to minimize the difference in color between the two sides that results from one side being submerged in fat for a longer period of time and subjected to a high temperature since the fat pumped up and over the doughnut is somewhat cooled in the process.

Employing the above apparatus, there were produced doughnuts of exceedingly low fat absorptions, 1 ounce per dozen, from a formulation that would normally absorb 2 or more ounces per dozen. The product has a specific volume of 3.7 cc./gram and can be produced at the rate of at least 40 dozen per hour for one cutter in an apparatus 3 feet in length.

As indicated above, the dough pieces may be exposed to the high-frequency field in the leading zone following the inversion thereof. This may be accomplished merely by removing only the partition 77 and not the flipping assembly. Advantageously, the high-frequency field, in the latter case is confined, in addition to the trailing zone, to the trailing half of the leading zone.

While there have been described and illustrated preferred embodiments of the present invention, it is apparent that numerous alterations, omissions and additions may be made without departing from the spirit and scope thereof.

What we claim is:

1. A cooking apparatus comprising a vessel for containing a cooking oil, means for heating said oil, conveying means for advancing partially submerged articles through said oil from a trailing toward a leading part of said vessel, means for depositing pieces of dough into said trailing part of said vessel, and means for establishing a high-frequency electromagnetic field in the area of said vessel forward of said trailing part.

2. The apparatus of claim 1, wherein said vessel extends from a trailing end to a leading end and means defining a radiation confining compartment disposed forward of said vessel trailing end and having a trailing inlet opening and a leading outlet opening spaced along said vessel, said high-frequency field being established in said compartment and said dough depositing means being disposed at a point trailing said compartment inlet opening.

3. The apparatus of claim 2, wherein said advancing means comprises an endless chain having an advancing upper run and a plurality of regularly longitudinally spaced transversely extending flights carried by said endless chain.

4. The apparatus of claim 2, including means positioned forward of said inlet opening for turning said pieces of dough.

5. The apparatus of claim 5, wherein said turning means is disposed adjacent said outlet opening.

6. The apparatus of claim 2, including radiation shields covering said vessel leading and trailing said compartment having openings at their outer ends.

7. Apparatus for forming and cooking a chemically leavened doughnut comprising a dough ring cutting and extruding device for extruding a shaped, heat-expandable and chemically leavened dough piece from an extrudible dough batch, a fryer including an elongated frying vessel adapted to contain an edible frying medium and arranged in relation to said device such that successive extruded pieces are dropped into an edible frying medium contiguous to one end of said frying vessel to totally immerse the same therein, heater means for maintaining said edible frying medium at a frying temperature wherein said medium is a liquid, successive extruded pieces being totally immersed in said edible frying medium to form a shape-retention skin thereon and becoming buoyant after a period of total immersion and floating to the surface of the frying medium, means for conveying successive extruded pieces toward the other end of said frying vessel with a lower portion of each piece remaining immersed in said frying medium and an upper portion thereof being exposed above the surface of said frying medium and a microwave source along an intermediate length of said frying vessel arranged to subject the upper portion of successive extruded pieces to microwave energy, said microwave source being of an intensity to heat, expand and at least partially cook the upper portion of successive extruded pieces.

8. Apparatus according to claim 7, including means following said intermediate length of said frying vessel for turning successive extruded pieces over to subject the expanded upper portion of successive extruded pieces to said frying medium along a further length of said frying vessel.

9. Apparatus for forming and frying bakery products comprising a frying tank having an input section, an intermediate section and an output section and adapted to contain a liquid cooking medium, means for heating said cooking medium to a frying temperature, a conveyor arranged within said tank for advancing partially submerged bakery products to be fried along a conveyor path from said input section through said intermediate section and to said output section at a prescribed rate, a dough ring cutting and extruded device arranged over said input section of said frying tank and adapted to drop successive extruded dough pieces for said bakery product into said input section of said frying tank along said conveyor path, said conveyor being constructed and arranged such that successive dough pieces are initially totally submerged in said cooking medium and then advanced toward said intermediate section in a partially submerged condition, a microwave generator including a cavity and an energy-outlet port arranged to introduce said microwave to said intermediate section of said frying tank and along said conveyor path such that successive partially submerged dough pieces are exposed to microwave energy from said microwave generator for a time determined by said prescribed rate and the dimensioning of said energy outlet port and a dough piece-turning mechanism arranged within said frying tank along said conveyor path and following said intermediate section for turning successive dough pieces after exposure to said microwave energy and delivering the turned dough pieces to said output section.

10. Apparatus according to claim 9, including means along said input section of said frying tank arranged to preclude successive dough pieces being dropped into said frying tank from coming into contact with the bottom thereof.

11. Apparatus according to claim 9, wherein said means includes a drop plate spaced above the bottom of said frying tank.

12. Apparatus for forming and cooking a chemically leavened bakery product comprising a cutting and extruding device for extruding a shaped, heat-expandable and chemically leavened dough piece from an extrudible dough batch, a fryer including a frying vessel adapted to contain an edible frying medium and arranged in relation to said device such that successive extruded pieces are dropped into an edible frying medium in said frying vessel, heater means for maintaining said edible frying medium at a frying temperature wherein said medium is a liquid, means for conveying successive extruded pieces along said frying vessel with a lower portion of each piece remaining immersed in said frying medium and an upper portion being exposed above the surface of said frying medium and a microwave source along the length of said frying vessel arranged to subject the upper portion of successive extruded pieces to microwave energy, said microwave source being of an intensity to heat, expand and at least partially cook the upper portion of successive extruded pieces.

13. Apparatus according to claim 12, including means in said frying vessel and spaced from said microwave source for turning successive extruded pieces over after exposure to said microwave source to thereafter subject the expanded and cooked upper portion of successive extruded pieces to said frying medium along a further length of said frying vessel.

* * * * *